(12) United States Patent
Tang et al.

(10) Patent No.: US 6,632,485 B1
(45) Date of Patent: Oct. 14, 2003

(54) HIGH GLOSS INK JET RECEIVING MEDIUM

(75) Inventors: Yu Ying Tang, Hadley, MA (US); Son T. Vo, Springfield, MA (US); A. Richard Taylor, Springfield, MA (US)

(73) Assignee: InteliCoat Technologies, LLC, South Hadley, MA (US)

( * ) Notice: Subject to any disclaimer, the term of this patent is extended or adjusted under 35 U.S.C. 154(b) by 0 days.

(21) Appl. No.: 09/264,024

(22) Filed: Mar. 8, 1999

(51) Int. Cl.[7] .................................................. B32B 3/00
(52) U.S. Cl. .................. 428/32.1; 428/32.24; 428/32.38
(58) Field of Search .............................. 428/195, 478.2, 428/423.1, 524, 32.1, 32.24

(56) References Cited

U.S. PATENT DOCUMENTS

| | | |
|---|---|---|
| 5,302,439 A | 4/1994 | Malhotra et al. |
| 5,418,078 A | 5/1995 | Desie et al. |
| 5,568,173 A | 10/1996 | Leenders et al. |
| 5,570,120 A | 10/1996 | Sakaki et al. |
| 5,695,588 A * | 12/1997 | Daems et al. ............... 156/247 |
| 5,798,173 A * | 8/1998 | Momma et al. ............ 428/342 |

FOREIGN PATENT DOCUMENTS

EP 791475 * 8/1997 .......... B41M/5/00

* cited by examiner

*Primary Examiner*—Bruce H. Hess
*Assistant Examiner*—Michael E. Grendzynski
(74) *Attorney, Agent, or Firm*—Burns, Doane, Swecker & Mathis, L.L.P.

(57) ABSTRACT

The present invention provides a high gloss ink jet receiving medium with fast ink dry time, good dye fade resistance, good dimensional stability, and good durability. The coating comprises a polypeptide such as gelatin or modified gelatin. One of the following two types of plasticizers is also incorporated into the coating to reduce the curl of the coated sheets at low humidity: a) 2-Pyrrolidone and its derivatives such as hydroxyethyl pyrrolidone and N-cyclohexyl-2-pyrrolidone, and b) urea and its derivatives such as imidazolidinyl urea, diazolidinyl urea, 2-hydroxyethylethylene urea, and ethylene urea. A polyurethane dispersion is incorporated into the coating to increase the flexibility of the coating at low humidity and to reduce the tack of the coating at high humidity. The polymers can be crosslinked with one or a combination of crosslinkers such as trivalent metal ions, polyfunctional aziridine, and polyamide-epichlorohydrin resin.

15 Claims, No Drawings

HIGH GLOSS INK JET RECEIVING MEDIUM

BACKGROUND OF THE INVENTION

1. Field of the Invention

The present invention relates to a high gloss ink jet medium. More particularly, the present invention relates to an ink jet medium comprised of a gelatin containing ink receiving layer. The ink jet medium of the present invention exhibits excellent curl stability and flexibility.

2. Description of the Related Art

Ink jet printing technology is a non-impact printing technique in which color dots are formed on a substrate from the ink droplets ejected from nozzles in the print head. The inks are generally composed of water, water-soluble or water-dispersible dyes, water-miscible cosolvents, and surfactants. The ink receiving layer is usually made from water-soluble or water-swellable polymers coated on a film or paper substrate. The coating absorbs ink through rapid swelling of the coated polymers and forms an image. High resolution photo-realistic color images can be formed on a well designed ink jet media based on water-soluble or water-swellable polymers. The major disadvantages of this type of coating, however, are long ink dry time and low water resistivity of both the coating and the printed image.

In order to obtain a high quality image without ink bleeding and/or coalescence, the polymeric coating needs to absorb a high amount of water rapidly. On the other hand, the coating needs to be water-resistant to provide good durability. These two requirements frequently conflict with each other. There have been many attempts to improve the water resistivity while maintaining the high water adsorption rate of ink jet recording media. One approach suggested is to use a blend of hydrophilic and hydrophobic polymers in the coating, such as described in U.S. Pat. Nos. 4,935,307 and 5,101,218. Another approach suggests forming a semi-interpenetrating polymer network where at least one of the polymeric components is crosslinked to form a continuous network through which uncrosslinked hydrophilic polymers are intertwined. For example, see EP patents 0482836, 0482837 and 0482838. A third approach for attempting to achieve a combination of a high ink adsorption rate and good coating durability is to utilize polymers which form a hydrogel at ambient conditions. The most popular polymer for this approach is gelatin, which absorbs water and swells quickly at ambient conditions while maintaining the physical integrity of the coating. The physical strength of the gelatin coating saturated with ink can be further improved through crosslinking.

Gelatin based coating has the advantages of high gloss, fast water absorbing properties, easy to achieve high water resistance, and good dye fading resistance. U.S. Pat. No. 4,649,064 describes an ink jet media comprised of gelatin crosslinked by a vinylsulfonyl compound to render the coating water resistant. This coating also contains multivalent metal ions to mordant the dye molecules. U.S. Pat. Nos. 5,474,843 and 5,656,378 describes an ink jet media composed of hardened gelatin and a dye mordant selected from one of the following groups: quaternary ammonium, amino compounds, phospholipids, divalent group II metal ions, and polyvinyl pyridine. U.S. Pat. No. 5,141,599 describes an ink jet media composed of a blend of gelatin and starch. U.S. Pat. No. 5,650,216 describes an ink jet media which is composed of two layers of coatings where the base layer is a blend of gelatin and an acrylic polymer to promote adhesion to the substrate, and the top layer is a blend of gelatin with a hydrophilic polymer. U.S. Pat. No. 5,532,064 covers a crosslinked gelatin network for ink jet application, which contains a small percentage of dicyandiamide (less than 1%). This small amount of dicyandiamide is alleged to help retain water in the coating. European Patents 704314 and 701902 describe an ink jet coating which is a blend of gelatin and polymethyl methacrylate (PMMA) beads. A large amount of PMMA beads (20–1500 wt % based on gelatin) is claimed to help reduce the ink dry time.

There are two major disadvantages to a gelatin-based coating which are not addressed in the existing art, i.e., curl and brittleness of the coating. Generally, a gelatin coating curls tremendously toward the end of drying process, which increases processing difficulties. Gelatin coated sheets also curl severely in a dry environment, which is highly undesirable for its printing and handling. Another disadvantage of a gelatin coating is that the coating is very brittle in a low humidity environment. The brittleness may become so severe when the humidity drops below 30% relative humidity (RH) that the coated sheet cracks during handling.

It would be of great advantage to the industry if an ink jet medium were available which not only takes advantage of the gelatin based coating to provide high gloss, good water resistance, fast ink dry time, and good dye fading resistance, but also overcomes the curl and brittleness of this type coating. It is therefore an object of the present invention to provide such an ink jet medium.

These and other objects of the present invention will become apparent to the skilled artisan.

SUMMARY OF THE INVENTION

The present invention provides a gelatin-containing ink jet medium which provides high gloss, superb imaging characteristics, fast ink dry time, good image fade resistance, good durability in terms of water resistance and crack resistance, and good dimensional stability in terms of curl resistance. The high gloss ink jet receiving medium of the present invention comprises an ink receiving layer on a substrate, which layer is comprised of a polypeptide such as gelatin or modified gelatin. The layer further comprises at least one of the following two types of plasticizers: a) 2-Pyrrolidone and its derivatives such as hydroxyethyl pyrrolidone and N-cyclohexyl-2-pyrrolidone, and/or b) urea and its derivatives such as imidazolidinyl urea, diazolidinyl urea, 2-hydroxyethylethylene urea, and ethylene urea. The presence of these specific plasticizers in the gelatin containing ink receiving layer have been found to reduce the curl of the medium at low humidity. A polyurethane dispersion is incorporated into the ink-receiving layer to increase the flexibility of the layer at low humidity and to reduce the tack of the layer at high humidity. The polymers can be crosslinked with one or a combination of crosslinkers, preferably selected from the group of trivalent metal ions, polyfunctional aziridine, or polyamide-epichlorohydrin resin. The medium of the present invention allows one to reduce curl without sacrificing the following properties of the coating: fast ink dry time, good coating durability, and good image fade resistance. The medium of the present invention also allows increased flexibility and reduced tack of the coating in a high humidity environment.

In another embodiment, the blending of other polymers containing carboxyl groups into the ink receiving layer has been found to help absorb the high boiling point solvents (humectants) in the ink.

In another embodiment of the present invention, applying a thin overcoat on top of the ink-receiving layer which, overcoat is more hydrophobic than the basecoat, has been found to reduce coating tack and to reduce ink dry time.

DETAILED DESCRIPTION OF THE PREFERRED EMBODIMENTS

A pure gelatin coating or a crosslinked gelatin coating will have substantial residual tensile stress in the dried coating and this residual stress causes curl toward the coating surface. The magnitude of the stress and the resultant curl is a function of humidity and temperature of the environment. The curl is most profound at low humidity environment when the equilibrium amount of moisture in the gelatin coating is low. As the humidity increases, the coating absorbs moisture from the atmosphere and the moisture plasticizes the coating and reduces the tensile stress in the coating. An anhydrous gelatin coating exhibits glass transition temperature ($T_g$) around 175° C.[A. G. Ward etc]. The Tg decreases as the humidity increases and it reaches room temperature at 80% relative humidity[Atong and Farris]. Assuming the substrate is moisture insensitive, a pure gelatin coating will experience zero stress at 80% relative humidity(RH) and it will be under tensile stress whenever the humidity falls below 80% RH. The magnitude of this tensile stress can be expressed as[Atong, Farris]:

$$\sigma = \int_{RH=80\%}^{RH=\kappa} -\frac{E\beta}{1-\nu} d(RH) \quad (1)$$

where $\sigma$ is the stress in the coating, E is the modulus of the coating, $\beta$ is the humidity expansion coefficient, $\nu$ is Poisson's ratio, and $\kappa$ is the humidity at which the stress is being calculated. Assuming both the coating and the substrate behave elastically, the curl caused by this tensile stress can be expressed as[S. Timoshenko]:

$$\lambda = \frac{1}{r} = \frac{\epsilon_1 - \epsilon_2}{h_1 + h_2} 6 \frac{\left(1 + \frac{h_1}{h_2}\right)^2}{3\left(1 + \frac{h_1}{h_2}\right)^2 + \left(1 + \frac{h_1}{h_2}\frac{E_1}{E_2}\right)\left(\frac{h_1^2}{h_2^2} + \frac{h_2}{h_1}\frac{E_2}{E_1}\right)} \quad (2)$$

where $\lambda$ is the curvature, r is the radius of the curl, $\epsilon_1$, $\epsilon_2$, $h_1$, $h_2$, and $E_1$, $E_2$ are strain, thickness, and modulus of the coating and the substrate, respectively. If the temperature remains constant and the humidity decreases from 80% to a lower humidity level, then:

$$\epsilon_2 \cong 0 \quad (3)$$

$$\epsilon_1 = \beta\Delta(RH) = \beta(80\% - RH_1)(\text{if } RH_1 \leq 80\%) \quad (4)$$

where $RH_1$ is the relative humidity at which the stress and curl are being considered. The following conditions are usually true in an ink jet coating:

$$\frac{h_1}{h_2} \ll 1 \quad (5)$$

$$\frac{h_1}{h_2}\frac{E_1}{E_2} \ll 1 \quad (6)$$

Combining equation (2), (3), (4), (5), and (6), one has:

$$\lambda \approx 6\beta\Delta(RH)\frac{h_1}{h_2^2}\frac{E_1}{E_2} = 6\beta(80\% - RH_1)\frac{h_1}{h_2^2}\frac{E_1}{E_2} \quad (\text{if } RH_1 \leq 80\%) \quad (7)$$

Equation (7) indicates that the curvature caused by humidity change is proportional to the humidity expansion coefficient of the coating, thickness of the coating, and modulus of the coating. The curvature also inversely proportional to the square of the thickness of the substrate and the modulus of the substrate. When the humidity is below 80%, the curvature of the coated sheet increases as the relative humidity decreases. If the humidity is greater than 80%RH, the gelatin coating is rubbery instead of elastic, Equation (7) is no longer valid. The stress of the coating and the substrate approaches zero and the curvature also approaches zero.

The above discussions apply to a pure gelatin coating on a dimensional stable and moisture insensitive substrate. If the coating is a blend of gelatin with other polymers and/or plasticizers, Equation (7) can be rewritten as:

$$\lambda \approx 6\beta\Delta(RH)\frac{h_1}{h_2^2}\frac{E_1}{E_2} = 6\beta(RH_0 - RH_1)\frac{h_1}{h_2^2}\frac{E_1}{E_2} \quad (\text{if } RH_1 \leq RH_0) \quad (8)$$

where $RH_0$ is the humidity level at which the glass transition temperature of the coating equals room temperature (23° C). The curvature approaches zero when the humidity is greater than $RH_0$.

Using equation (8), we found that by incorporating an appropriate plasticizer/humectant in the gelatin will reduce the curl through a) lowering the $RH_0$ of the coating, b) lowering the humidity expansion coefficient, and c) lowering the modulus of the coating. 2-Pyrrolidone and its derivatives such as N-(2-hydroxyethyl)-2-pyrrolidone and N-cyclohexyl-2-pyrrolidone have been found very effective at reducing the curl of a gelatin-based coating without reducing the water resistance of the coating. Another class of effective plasticizer/humectant is urea and its derivatives such as imidazolidinyl urea, diazolidinyl urea, 2-hydroxyethylethylene urea, and ethylene urea. The amount of plasticizer/humectant employed is generally in the range of from 2 to 20% based on the weight of gelatin. If the plasticizer is less than 2%, the curl reduction is inadequate. If the plasticizer is higher than 20%, the durability of the coating starts to deteriorate. More preferably, the amount of plasticizer used is in the range of from 5–15 wt %, and most preferably in the range of 5–10 wt %.

A low glass transition temperature polymer such as a soft polyurethane dispersion can reduce the humidity expansion coefficient and the modulus of the coating and therefore, reduce the curl. The lower the glass transition temperature of the polyurethane dispersion, the more effective it is as a curl reduction agent. This low $T_g$ polyurethane dispersion also serves to improve the flexibility of the coating and this effect is discussed in the following paragraph.

A gelatin coating has the disadvantages of being brittle at low humidity and tacky at high humidity. The brittleness is especially undesirable when a coated ink jet media is used in applications where folding is required such as in greeting cards. This brittleness can be overcome by incorporating certain amounts of a low glass transition temperature polymeric dispersion such as a polyurethane dispersion or acrylate latex such as poly(butylacrylate) latex. Polyurethane dispersion is preferred due to its high efficiency at imparting flexibility to the coating. The polyurethane used in this application can be anionic, nonionic, or cationic. The cationic polyurethanes such as those supplied by Gem Urethane Corporation under the tradename Gemflex 1031C and Gemflex 1032C are especially effective at reducing the brittleness of gelatin-based coating. The cationic nature of these polyurethane dispersion gives them the additional advantage of dye mordanting properties. The amount of polyurethane in the coating should be between 2 and 60% of the entire coating. When the polyurethane is below 2%, the coating brittleness is not dramatically improved. If the polyurethane is present in the coating at more than 60%, the water absorption rate of the coating deteriorates. Additional benefits of incorporating polyurethane in the coating include reducing the coating tack at high humidity and reducing curl of the coating at low humidity. More preferably, the amount of low glass transition polymer dispersion used is in the range of from about 5–25 wt %, and most preferably from 10–20 wt %.

An ink jet ink is usually composed of 60 to 90 wt % water, 0.3 to 5 wt % dyes, and 5 to 40 wt % high boiling point solvents. These solvents are present in the ink to prevent clogging of nozzles, to lower the surface tension of the ink, and to prevent ink composition and properties from changing with time. These high boiling point solvents are usually glycols such as diethylene glycol, glycerine, and polyethylene glycol, 2-pyrrolidone, and water-soluble glycol ethers. Gelatin's absorption rate toward most of the high boiling solvents in the inks, such as diethylene glycol, is relatively low, even though gelatin's water absorption rate is very high. We have found that the absorptivity of these solvents can either be improved by modifying gelatin or by incorporating other water-soluble polymers into the coating. For example, the gelatin itself can be phthalylated, succinylated, grafted with a hydrophilic monomer such as N-vinyl pyrrolidone or acrylamide. Though similar improvement toward absorption of the high boiling solvents can be made by blending gelatin with other water soluble polymers, most of the water-soluble polymers have very limited compatibility with gelatin. These polymers include fully hydrolyzed or partially hydrolyzed polyvinyl alcohol, hydroxyethyl cellulose, methyl cellulose, hydroxypropyl cellulose, polyethylene oxide, polyacrylamide, and the like. When a solution is made from the blend of gelatin and one of the above polymers, micro or macro phase separation occurs in solution and subsequently in dried coating. The dried coating exhibits high haze, low transparency, and low gloss. Naturally, this coating is not suitable as either high gloss photopaper application or as transparent film for overhead projecting application.

One class of polymer which exhibits good compatibility with gelatin is polymers which contain carboxyl functional groups. The carboxyl group can either be present in the polymers as a free acid or in its salt form. Examples of these polymers are: carboxylated polyvinyl alcohol, carboxymethyl cellulose, casein, gum arabic, polyacrylic acid and its copolymers or terpolymers, polymethylacrylic acid and its copolymers or terpolymers, and any other polymers which contain monomers of carboxylic acids such as acrylic acid, methacrylic acid, maleic acid, and crotonic acid. A high gloss coating with high solvent absorption rate can be obtained when this class of polymers are blended with gelatin. The percentage of the carboxylation in these polymers should be at least 2% in order to achieve good compatibility with gelatin. The amount of these polymers in the gelatin-based coating should be in the range of 0 to 60% of the total coating. If the content of these polymer exceeds 60% of the entire coating formulation, the gelation property of the coating deteriorates and the ink dry time and coating durability would suffer.

Two layer or even three layer coating constructions are usually better suited to simultaneously achieve the following properties in the ink jet applications: high gloss and superb image, fast ink drying time, good dimensional stability (minimize curl under any environmental conditions), good coating durability, good light fade stability, and low coating tack. In a one layer design, a plasticizer which serves the purpose of improving the dimensional stability of the coating may have the detrimental effect of increasing the high humidity tack of the coating and increasing the ink dry time at high humidity. This type of conflict can be resolved by employing a multilayer coating design. In a preferred design, the base coat is aimed at reducing the curl and absorbing the majority of the ink and the top coat is designed to reduce the tack and durability of the coating. These goals can be achieved in a two layer coating design if the following conditions are satisfied:

1. the top coat is much thinner than the base coat
2. the top coat is more hydrophobic than the base coat
3. the top coat has higher $T_g$ and higher $RH_0$ than the base coat In a preferred construction, the top coat contains a silicone modified polyurethane dispersion in the amount of 20 to 60% of the total top coat. This silicone modified polyurethane helps to make the top coat more hydrophobic so the ink has higher driving force to diffuse into the more hydrophilic base coat. Unlike the polyurethane used in the base layer, this silicone modified polyurethane should have a high glass transition temperature, higher than room temperature so it helps to maintain the coating durability and reduce the coating tack at high humidity.

The source of gelatin can be animal skin or bones. Acid processed gelatin, alkaline processed gelatin, and gelatin derivatives such as phthalated, acetylated, carbamoylated, and succinated gelatin can be used for this application. Gelatins made from different sources, different processing routes, and different modifications, can be used alone or in combination. The gel strength is preferably in the range of 150 to 350 bloom. The water resistance of the coating deteriorates if the gel strength is below 150 bloom.

Acid processed gelatin usually has an isoelectric point around pH=9 and the alkaline processed gelatin has an isoelectric point between pH=4.6 to 5.2. An acid processed gelatin is preferred for the ink jet application, since it has positive net charges when pH is lower than 9 and this positive charge provides mordanting properties for the acidic dye molecules in the ink. Additional dye mordants are sometimes needed to further improve water resistance of the printed image. Polyquaternary amine, polyethylene imine, copolymer of vinyl pyrrolidone and dimethylaminoethyl methacrylate, copolymer of vinyl pyrrolidone and methylvinylimidazole chloride, and aluminum polymeric complex are a few examples of the dye mordants can be employed. When aluminum ions or polyamide-epichlorohydrin is used as crosslinker, it has the additional advantage of the crosslinker also acts as a dye mordant.

Other ingredients which can be incorporated into the gelatin ink receiving layer include inorganic pigments such as silica and alumina, organic pigments such as polymethyl methacrylate beads and polystyrene beads. Minor additives such as surfactant, wetting agent, UV absorber, antioxidant, and optical brightner can also be incorporated.

The substrate for this medium can be clear or white polyester films, polyvinyl chloride films, polyethylene coextruded papers, canvas, sized papers, pigment coated papers, and resin coated papers. If adhesion is a problem when plastic films are used as substrates, either corona treatment or an adhesion promoting layer can be applied before the ink jet receiving layer. Many acrylic copolymers and polyurethane emulsions can be used as adhesion promoting layers for the gelatin containing ink receiving layer.

The details of this invention are further illustrated in the following examples. The tests conducted in these examples are described below:

1. Curl: three coated sheets (8.5"×11") were placed on a flat surface with the print side facing up. These sheets were conditioned at 15° C. and 20% RH for 4 hours. The distance between the flat surface and the highest curled corner of the sheet was measured and averaged over three sheets. If the sheets curl towards the print side, it is reported as positive curl. Otherwise, it is reported as negative curl.

2. Brittleness/crack: a 40 mm×180 mm test strip was cut from the coated sheets and were conditioned at 23° C. and 20% RH for 4 hours. These strips were then placed on a flat surface and folded into a loop with coated side out. A 4 pound roller (width×diameter=45 mm×94 mm) with handles was rolled over the fold. A total of 10 strips were tested from each sample. The folded area was examined under a 25× microscope and the flexibility of the coating was rated on a scale of 1 to 5. 1=no crack, 2=fewer than 50% fine cracks, 3=50 to 100% fine cracks, 4=some large cracks, 5=massive large cracks.

3. Image quality: coated sheets (8.5"×11") were conditioned at 23° C. and 50% RH for 4 hours, then large color blocks of cyan, magenta, yellow, black, blue, green, and red were printed at 23° C. and 50%RH. The solid color uniformity was visually inspected and rated on a scale of 1 to 5. 1=very uniform color image, excellent; 2=very slight coalescence/beading, good; 3=slight coalescence/beading, OK; 4=moderate coalescence/beading, bad, 5=severe coalescence/beading, very bad.

4. Ink dry time: a black strip and a blue strip (height× width=1 cm×20 cm) were printed side by side on the tested samples, after the samples have been conditioned at 23° C. and 50% RH for 4 hours. Immediately after printing, the sample were placed on a flat surface and an area of black was smeared into the unimaged area with one finger tip while applying moderate pressure. The same procedure was applied to the blue color area. The above steps were repeated every 15 seconds until the ink does not smear beyond the printed area. This was recorded as the ink dry time.

5. Fade resistance of the image: color blocks of cyan, magenta, yellow, and black, were printed and the color scales of L*, a*, and b* were measured using a 10° standard observer and D65 illumination with a X-Rite 938. The samples were then placed in a fadometer (HPUV by Atlas) for an exposure equivalent to 10 years indoor light (assuming the light intensity is 450 lux and the illumination is 12 hours a day and 7 days a week). The L*, a*, and b* value were measured again and the color difference (ΔE) was calculated:

$$\Delta E = \sqrt{(\Delta L^*)^2 + (\Delta a^*)^2 + (\Delta b^*)^2}.$$

Among all the color tested, only the highest ΔE value was reported here and that color was indicated in the parenthesis following the ΔE value.

6. Water resistance of the image: Color blocks of cyan, magenta, yellow, black, blue, green, and red were printed with Novajet Pro printer and the Graphic Standard (GS) ink set supplied with the printer. The optical density of these blocks was measured with a X-Rite 938 and the color gamut was calculated. These blocks were then immersed in water for ten minutes and rinsed. The wet image was padded with a cotton cloth to dry away the excess water and allowed to air dry for an hour. The optical density of the primary and secondary color blocks were again measured with the same X-Rite 938. The percentage loss in optical density was recorded. Among all the colors tested, only the highest color density loss was reported and that color-was indicated in the parenthesis.

EXAMPLES 1–7

Comparative Examples 1–3

15 parts of acid processed pigskin gelatin (Kind and Knox, 266 bloom, isoelectric point: pH=9) was added into 85 parts distilled water and stirred slowly for 10 minutes until the gelatin granules were fully dispersed. The temperature of the solution was then raised to 45° C.±5° C. and maintained at this temperature. It was stirred until a clear solution was obtained. To this solution, the other ingredients listed in Table 1 were added and mixed. The final coating solution was maintained at 45° C.±5° C. and the concentration of the solution was adjusted to be 15% solid. This solution was then coated on a polyethylene coextruded paper (115 g/m² polyethylene coextruded on both sides of the base paper) with a Myer rod to achieve a dried thickness of 12 μm. The coating was dried at 110° C. for 3 minutes.

The gloss, curl, and the flexibility of the coating were measured as described previously and the results are shown in Table 2. The coated samples were then imaged with the Novajet Pro printer by Encad, along with the graphic extend (GX) ink set of this printer. The ink dry time, imaging quality, and fade resistance of the samples were evaluated and the results are also shown in Table 2.

Comparing with the performance of pure gelatin (comparative example 1), examples 1 and 2 show how the plasticizers have greatly reduced the curl at low humidity; examples 3 and 4 indicate the polyurethane dispersion has eliminated the brittleness of the coating at low humidity; and examples 6 and 7 shows the effects of carboxylated hydrophilic polymer towards improving ink absorptivity and thus improving the image quality. Comparative examples 2 and 3 indicate that the limited compatibility between gelatin and the uncarboxylated hydrophilic polymers results low coating gloss. All the above examples show great color fading resistance: the highest ΔE value of all the colors among all the samples is lower than 10 after a simulated 10 year indoor light exposure.

EXAMPLES 8–10

Coating solutions were prepared the same way as described in examples 1–7, according to the compositions in Table 3. The solutions were coated on the same polyethylene coextruded paper as described in examples 1–7 with a Myer rod to achieve a dried thickness of 12 μm. The coating was dried at 110° C. for 3 minutes.

The coated sheets were imaged at 23° C. and 50% RH with the Novajet Pro printer by Encad, with graphic standard (GS) ink set. The physical properties, imaging performance, and water resistance of these samples were evaluated and the results are listed in Table 4.

EXAMPLES 11–14

Two Layer Coatings

Coating solutions were prepared based on the composition listed in Table 5. Then the base layer coating was first coated on a polyethylene coextruded paper with a Myer rod to achieve a dried thickness of 10 μm. The coating was dried at 110° C. for 3 minutes. Then the coating solutions for the top layer was coated on top of the dried base layer to achieve a dried thickness of 1 μm.

The coated sheets were imaged at 23° C. and 50%RH with HP890 printer. The performance of these samples are shown in Table 6.

TABLE 1

Compositions of Examples 1–7 and Comparative Examples 1–3

| | | Plasticizer | | Polyurethane | | Hydrophilic polymer | | Other polymer | |
|---|---|---|---|---|---|---|---|---|---|
| | gelatin[1] | HEP[2] | IMU[3] | G1031C[4] | G307[5] | CMC[6] | PAA-co[7] | HEC[8] | PVOH[9] |
| Examples | | | | | | | | | |
| 1 | 92 | 8 | | | | | | | |
| 2 | 92 | | 8 | | | | | | |
| 3 | 90 | | | 10 | | | | | |
| 4 | 88 | | | | 12 | | | | |
| 5 | 82 | 8 | | 10 | | | | | |
| 6 | 62 | 8 | | | 12 | 18 | | | |
| 7 | 62 | 8 | | | 12 | | 18 | | |
| Comparative Examples | | | | | | | | | |
| Comp 1 | 100 | | | | | | | | |
| Comp 2 | 62 | 8 | | | 12 | | | 18 | |
| Comp 3 | 62 | 8 | | | 12 | | | | 18 |

[1]acid-processed pigskin gelatin from Kind and Knox Gelatine, Inc.: 260–290 bloom.
[2]hydroxyethyl pyrrolidone.
[3]imidazolidinyl urea.
[4]Gemflex 1031C, a soft cationic aliphatic polyurethane dispersion from Gem Urethane Corp.
[5]Gemflex 307, a soft anionic aliphatic polyurethane dispersion from Gem Urethane Corp.
[6]Aqualon CMC 7L from Hercules: carboxymethyl cellulose with a degree of substitution 0.7.
[7]DP6-6066 from Allied Colloids Inc: a copolymer of polyacrylic acid.
[8]Natrosol 250JR from Hercules: hydroxyethyl cellulose.
[9]Airvol 325 from Air Products: polyvinyl alcohol.

TABLE 2

Performance of Examples 1–7 and Comparative Examples 1–3

| | Gloss | Curl (mm) | Flexibility | Imaging Quality | Dry time (sec) (23° C./50% RH) | | Fade Resistance $\Delta E^{max}$ |
|---|---|---|---|---|---|---|---|
| | 60° | 15° C./20% RH | 15° C./20% RH | uniformity | black | blue | (10 yr) |
| Examples | | | | | | | |
| 1 | 100 | +3 | 3 | 2 | 0 | 15 | 7.7 (cyan) |
| 2 | 99 | −2 | 4 | 3 | 30 | 90 | 4.2 (cyan) |
| 3 | 100 | +22 | 1 | 2 | 0 | 15 | 5.9 (cyan) |
| 4 | 99 | +27 | 1 | 2 | 15 | 30 | 6.4 (cyan) |
| 5 | 100 | 0 | 1 | 2.5 | 0 | 30 | 8.9 (cyan) |
| 6 | 97 | +5 | 1.5 | 1 | 0 | 30 | 7.0 (cyan) |
| 7 | 98 | −1 | 1 | 1.5 | 15 | 30 | 5.2 (cyan) |
| Comparative Examples | | | | | | | |
| Comp 1 | 99 | +72 | 5 | 2 | 15 | 30 | 6.1 (cyan) |
| Comp 2 | 62 | −1 | 1 | 2 | 30 | 45 | 7.9 (cyan) |
| Comp 3 | 60 | 0 | 1 | 2.5 | 30 | 150 | 9.1 (cyan) |

TABLE 3

Compositions of Examples 8–10

| | Plasticizer | Polyurethane | Dye mordant | Crosslinkers | |
|---|---|---|---|---|---|
| Examples | gelatin[1] | HEP | G1031C | Cypro 516[10] | Xama 7[11] | Al$_2$(SO$_4$)$_3$18H$_2$O |
| 8 | 84 | 8 | 8 | | | |
| 9 | 82 | 8 | 8 | 2 | | |
| 10 | 80 | 8 | 8 | | 2 | 2 |

[10]Cypro 516 from CYTEC: dimethylamine/epichlorohydrin polymer
[11]Xama 7 from B. F. Goodrich: pentaerythritol-tris-(b-(n-aziridinyl)) propionate

TABLE 4

Performance of Examples 8–10

| Examples | gloss (%) 60° | curl (mm) 15° C./20% RH | flexibility 15° C./20% RH | Image quality uniformity | dry time (sec) (23° C./50% RH) black | dry time (sec) (23° C./50% RH) blue | water-fastness $\Delta OD^{max}$ (10 min) |
|---|---|---|---|---|---|---|---|
| 8 | 99 | −1 | 1 | 1.5 | 0 | 60 | −0.14 (yellow) |
| 9 | 100 | 0 | 1 | 1.5 | 0 | 60 | −0.13 (black) |
| 10 | 99 | 0 | 1 | 1.5 | 0 | 45 | −0.03 (cyan) |

TABLE 5

Compositions of Examples 11–13

| | Base layer coating | | | Top layer coating gelatin | | |
|---|---|---|---|---|---|---|
| Examples | gelatin[1] | HEP | G409[12] | 7992[13] | R-9649[14] | T-350[15] |
| 11 | 80 | 5 | 15 | 50 | 50 | |
| 12 | 80 | 5 | 15 | | 50 | 50 |
| 13 | 80 | 5 | 15 | 40 | 40 | 20 |

[12]Gemflex 409: an aromatic polyurethane dispersion from Gem Urethane Corp.
[13]succinylated gelatin from Kind & Knox Gelatine, INC.
[14]Neorez R-9649: silicone modified polyurethane dispersion from Zeneca Resins.
[15]Gohsenal T-350: carboxylated polyvinyl alcohol from Nippon Gohsei

TABLE 6

Performance of Examples 11–13

| Examples | gloss (%) 60° | curl (mm) 15° C./20% RH | flexibility 15° C./20% RH | Image quality uniformity | dry time (sec) (23° C./50% RH) black | dry time (sec) (23° C./50% RH) blue | Fade resistance $\Delta E^{max}$ (5 yr) |
|---|---|---|---|---|---|---|---|
| 11 | 98 | +2 | 1 | 1 | 45 | 0 | 19.5 (yellow) |
| 12 | 97 | 0 | 1 | 1 | 30 | 0 | 14.8 (cyan) |
| 13 | 95 | 0 | 1 | 1 | 30 | 0 | 11.6 (cyan) |

While the invention has been described with preferred embodiments, it is to be understood that variations and modifications may be resorted to as will be apparent to those skilled in the art. Such variations and modifications are to be considered within the purview and the scope of the claims appended hereto.

What is claimed is:

1. An ink jet medium comprised of an ink receiving layer and a substrate, with the ink receiving layer consisting essentially of (i) a polypeptide; (ii) at least one plasticizer, wherein the plasticizer comprises hydroxyethyl pyrrolidone or n-cyclohexyl-2-pyrrolidone; and, (iii) an anionic polyurethane polymer.

2. The ink jet medium of claim 1, wherein the polypeptide comprises a gelatin.

3. The ink jet medium of claim 1, wherein the polypeptide comprises a modified gelatin.

4. The ink jet medium of claim 1, wherein the amount of plasticizer contained in the ink receiving layer comprises from 2 to 20 wt % based upon the weight percent of the polypeptide.

5. The ink jet medium of claim 4, wherein the amount of plasticizer comprises from 5 to 15 wt %.

6. The ink jet medium of claim 4, wherein the amount of plasticizer comprises from 5 to 10 wt %.

7. The ink jet medium of claim 1, wherein the amount of the polyurethane polymer in the ink receiving layer ranges from 2 to about 60 wt %.

8. The ink jet medium of claim 7, wherein the amount of the polyurethane polymer in the ink receiving layer ranges from about 5 to 25 wt %.

9. The ink jet medium of claim 7, wherein the amount of polyurethane polymer ranges from about 10 to 20 wt %.

10. The ink jet medium of claim 1, wherein the polymers are crosslinked.

11. The ink jet medium of claim 10, wherein the polymers are crosslinked using a crosslinker selected from trivalent metal ions, polyfunctional aziridine, polyamide-epichlorohydrin resin, or a mixture thereof.

12. The ink jet medium of claim 1, wherein the ink receiving layer further comprises polymers containing carboxyl groups.

13. The ink jet medium of claim 1, wherein the ink jet medium further comprises an overcoat on top of the ink receiving layer.

14. The ink jet medium of claim 13, wherein said overcoat is more hydrophobic than the ink receiving layer.

15. The ink jet medium of claim 13, wherein said overcoat is comprised of a silicone modified polyurethane dispersion, which dispersion comprises from 20 to 60 percent by weight of the topcoat.

* * * * *